United States Patent [19]

Bartmann et al.

[11] Patent Number: 4,904,718

[45] Date of Patent: Feb. 27, 1990

[54] THERMOPLASTIC MOLDING COMPOUNDS WHICH HAVE IMPACT STRENGTH WHEN COLD

[75] Inventors: Martin Bartmann, Recklinghausen; Armin Gude, Marl; Michael Droescher, Dorsten; Roland Feinauer, Marl, all of Fed. Rep. of Germany

[73] Assignee: Huels Aktiengesellschaft, Marl, Fed. Rep. of Germany

[21] Appl. No.: 178,326

[22] Filed: Apr. 6, 1988

[30] Foreign Application Priority Data

Jul. 1, 1987 [DE] Fed. Rep. of Germany ....... 3721770

[51] Int. Cl.$^4$ ............................................. C08L 77/06
[52] U.S. Cl. .................................... 524/169; 524/336; 524/606
[58] Field of Search ..................... 524/169, 336, 606

[56] References Cited

U.S. PATENT DOCUMENTS

| | | | |
|---|---|---|---|
| 2,276,437 | 3/1942 | Vaala | 524/169 |
| 4,059,653 | 11/1977 | Mathis et al. | 524/606 |
| 4,148,775 | 4/1979 | Shima et al. | 524/169 |
| 4,173,556 | 11/1979 | Loran et al. | 524/291 |

FOREIGN PATENT DOCUMENTS

| | | | |
|---|---|---|---|
| 9472 | 3/1973 | Japan | 524/169 |
| 161426 | 12/1981 | Japan | 524/169 |

*Primary Examiner*—Lewis T. Jacobs
*Assistant Examiner*—David W. Woodward
*Attorney, Agent, or Firm*—Oblon, Spivak, McClelland, Maier & Neustadt

[57] ABSTRACT

Thermoplastic molding compounds which have high cold impact strength. The molding compounds are comprised of (i) a polyamide 1012 with a relative viscosity in the range of 1.5–3.0; and (ii) a plasticizer in the amount 2–25 wt. % based on the weight of the polyamide. The inventive molding compounds enable manufacture of molded pieces.

6 Claims, No Drawings

THERMOPLASTIC MOLDING COMPOUNDS WHICH HAVE IMPACT STRENGTH WHEN COLD

BACKGROUND OF THE INVENTION

1. Field of the Invention

The invention relates to thermoplastic molding compounds which have high impact strength when cold.

2. Discussion of the Background

There are stringent practical requirements which are placed on the physical properties of thermoplastic molding compounds, e.g. molding compounds to be used for manufacturing piping and the like. The materials must be inert to the goods being conveyed, and must be dimensionally stabile when thermally stressed. For piping to be used outdoors, the materials must be weather resistant, i.e. they must materially preserve their useful properties when acted upon by solar radiation, airborne moisture and humidity, cold, and the like.

Generally, all of the familiar polyamides (PA) are suitable for molded parts. However, there are limitations, particularly for outdoor use. Thus, there are no known industrially used polyamides which have at least one monomer with $\leq 10$ carbon atoms in the hydrocarbon chain which are not appreciably sensitive to water or airborne moisture. Attack by water causes these polymers to substantially lose their impact strength, particularly impact strength at low temperature ("Kunststofftaschenbuch" 19th Ed., pub. C. Hanser Verlag, pp. 294-295, table).

Polyamides with more carbon atoms in the hydrocarbon chain are more suitable, e.g. polyamides 11 and polyamides 12, because they have better weather resistance and thereby better cold impact strength. However, these industrially readily available higher polyamides have the disadvantage that when plasticizers are employed with them they lose their impact strength. This problem must be alleviated by using an impact strength modifier (Ger. AS 27 16 004). This compels one to work with a 3-component system, which is a drawback.

A further disadvantage of polyamides 11 and polyamides 12 is that they are produced from a lactam or the corresponding aminocarboxylic acid, and as a matter of course the raw polymer contains monomers and oligomers which must be removed from the product in an additional process step.

Plasticizers and their use in polyamides are per se known.

A continuing need exists for a molding compound based on a polyamide, which does not lose its cold impact strength even when plasticizers are employed, or under the action of weathering (e.g. moisture). Preferably the material should comprise a 2-component system.

SUMMARY OF THE INVENTION

Accordingly, one object of the present invention is to provide a molding compound based on a polyamide which does not lose its cold impact strength.

Another object of the invention is to provide a polyamide molding compound which does not lose its cold impact strength when plasticizers are employed or under severe weather conditions.

These and other objects which will become apparent from the following specification have been achieved by the present thermoplastic molding compounds having high cold impact strength which comprise (i) a polyamide 1012 with a relative viscosity in the range of 1.5-3.0, and (ii) a plasticizer in the amount of 2-25 wt. % based on the weight of the polyamide.

DETAILED DESCRIPTION OF THE PREFERRED EMBODIMENTS

The molding composition of the present comprises a polyamide 1012 with a relative viscosity in the range of 1.5-3.0 and 2-25 wt. % of a plasticizer based on the weight of the polyamide. It is preferred if the relative viscosity of the polyamide 1012 is in the range of 1.8-2.5.

The designation "PA 1012" or "polyamide 1012" is according to international standard, wherewith the first number(s) of the designation represent(s) the number of carbon atoms in the starting amine, and the last number(s) represent(s) the number of carbon atoms in the dicarboxylic acid. If only one number is given, it means that the stating substance is an aminocarboxylic acid or its lactams (Dominighaus, H., 1976, "Die Kunststoffe und ihre Eigenschaften" pub. VDI-Verlag, p. 272).

A general overview of plasticizers which are suitable for polyamides may be found in Gaechter and Mueller, ("Kunststofftaschenbuch" 19th Ed., pub. C. Hanser Verlag).

Suitable compounds for use as plasticizers are, for example esters of p-hydroxybenzoic acid with 2-12 carbon atoms in the alcohol component, or amides of arylsulfonic acids with 2-12 carbon atoms in the amine component. Amides of benzenesulfonic acid are preferred.

Specific candidates for plasticizers are, e.g., p-hydroxybenzoic acid ethyl ester, p-hydroxybenzoic acid octyl ester, toluenesulfonic acid n-butylamide, toluenesulfonic acid n-octylamide, benzenesulfonic acid n-butylamide, and benzenesulfonic acid n-2-ethylhexylamide. Preferred is benzenesulfonic acid n-butylamide.

The preferred range of plasticizer content in the inventive molding compounds is 4-20 wt. % based on the weight of the polyamide.

The preparation of polyamides 1012 is known (Vieweg, R., and Mueller, A., 1966, "Kunststoffhandbuch, Bd. 6—Polyamid", pub. C. Hanser Verlag, Munich, p. 187; Floyd, Don. E., 1966, "Polyamide-Resins", 2nd Ed., pub. Chapmann Hall, N.Y./London, pp. 55 ff.).

The inventive molding compounds may contain other additives in addition to plasticizers; these include stabilizers, pigments, fillers, elasticizers, etc.

The inventive molding compounds may be mixed with other polyamides or other polymers known in mixtures with polyamides, provided that the desired properties according to the invention are not adversely affected.

The inventive molding compounds are prepared by customary methods known in the art, e.g., thorough mixing of the basic polyamide, the plasticizer, and possibly other additives, in a two-shaft kneader-mixer; or diffusion of the plasticizer, along with any additives soluble in the plasticizer, into the basic polyamide which is in granular form.

The molding compounds have a number of unexpected advantageous properties in comparison with other known polyamide molding compounds. One advantage is the ability to employ a 2-component system. Molded parts are obtained according to the invention which retain their desirable properties when exposed to weathering, particularly retention of properties at low temperatures.

This is not the case with conventional polyamides which have fewer carbon atoms (<10) in the starting monomers, nor with polyamides having more carbon atoms and containing plasticizers. Another advantage in comparison to polyamides 11 or polyamides 12 is that polyamides are now made available by the present invention which do not require an extra operation for removal of monomers and low molecular weight components from the raw polymer. Particularly noteworthy is the fact that the inventive molding compounds based on polyamides 1012 perform so well, in view of the fact that the analogous polyamides 1210 give molding compounds with inferior properties (see Comparison Example).

Other features of the invention will become apparent in the course of the following descriptions of exemplary embodiments which are given for illustration of the invention and are not intended to be limiting thereof.

EXAMPLES

The relative viscosities ($\eta_{rel}$) of the polyamides are determined in m-cresol using 0.5 g polyamides in 100 cc m-cresol at 25° C. (DIN 53 727).

The cold impact strength of the molding compounds used in the Examples was measured using tubes with an outer diameter 6.35 mm and wall thickness of 1 mm. The tubes were fabricated on a 20-D single screw extruder with a 3-zone screw, with the molding compound temperature at about 220°-240° C. Part of the tube was untreated, another part was boiled 2 hr. in water, and a third part was treated 24 hr at 110° C. in air in an oven. 10 examples of each of the heated, boiled, and untreated tubes were subjected to cold impact strength testing (SAE J 844) at −40° C. The number of failing tubes is given in the Table, below.

The tests having letter designations are not according to the invention.

Preparation of polyamide 1012:

Forty parts by wt. of the 1,10-diaminodecane salt of dodecanedioic acid (prepared from 17.11 parts by wt. 1,10-diaminodecane and 22.89 parts by wt. dodecanedicarboxylic acid) and 0.1 parts by weight dodecanedicarboxylic acid were charged into a pressure-tight, heated polycondensation reactor, with interior temperature 160° C. Vacuum application followed by introduction of nitrogen was carried out 5 times, to create inert conditions in the reactor. Then, 4 parts by wt. water mixed with 0.01 part by wt. H$_3$PO$_4$ were added, via an airtight transfer channel. The mixture was then heated 120 min with stirring, to an internal temperature of 220° C. The internal pressure increased to 19 bar. Then the pressure was reduced continuously over 90 min, and the reactor contents were heated to an internal temperature 260° C. After the desired melt viscosity was reached, the stirrer was turned off, a nitrogen overpressure of 20 bar was established, and after 30 min standing time the polyamide 1012 ($\eta_{rel}$=1.85) was removed with the aid of a viscose pump, was cooled in a water bath, and was granulated.

To raise the $\eta_{rel}$ to 2.15, the polyamide 1012 was subjected to further polycondensation in the solid phase at 170° C.

Preparation of polyamide 1210:

The polyamide 1210 was prepared analogously to the polyamide 1012, but with the starting materials 40 parts by wt. of 1,12-diaminododecane salt of decanedioic acid (prepared from 19.9 parts by wt. 1,12-diaminododecane and 20.1 parts by wt. decanedioic acid) plus 0.09 parts by wt. decanedioic acid.

Preparation of polyamide 12:

The polyamide 12 was prepared according to Example 1 of Ger. Pat. No. 2,152,194. To raise the $\eta_{rel}$, the polyamide 12 was subjected to further polycondensation.

Preparation of the Molding Compounds:

100 parts by wt. of the polyamides, 1 part by wt. N,N'-bis[(3,5-di-tert.-buty-4-hydroxy)phenyl-propanoyl]hexanediamine, and plasticizers in amounts indicated in the Table, below, were mixed thoroughly in a double screw extruder, granulated, and dried to a residual moisture of <0.05 wt. %.

TABLE

| Test No. | Polyamide type | Viscosity (Din 53 727) | Plasticizer Type | Plasticizer Amount* | Cold Impact Strength Test (−40° C.)** Untreated | Cold Impact Strength Test (−40° C.)** After boiling 2 hr in water | Cold Impact Strength Test (−40° C.)** After heating 24 hr in 110° C. oven |
|---|---|---|---|---|---|---|---|
| 1 | 1012 | 2.15 | BBSA | 7 | 0 | 0 | 0 |
| 2 | 1012 | 2.15 | BBSA | 14 | 0 | 0 | 0 |
| 3 | 1012 | 2.15 | EHBA | 14 | 0 | 0 | 1 |
| 4 | 1012 | 2.35 | EHBA | 14 | 0 | 0 | 0 |
| A | 1210 | 2.2 | BBSA | 14 | 10 | 10 | 10 |
| B | 12 | 2.15 | BBSA | 14 | 6 | 9 | 7 |

BBSA = N—butyl benzenesulfonamide
EHBA = N—2-ethylhexyl benzenesulfonamide
* = of the polyamide
** = Data are numbers of tubes broken.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic molding compound having high cold impact strength, comprising:
   (i) a polyamide 1012 with a relative viscosity in the range of 1.5–3.0; and
   (ii) a plasticizer in the amount of 2–25 wt. % based on weight of the polyamide, wherein said plasticizer imparts high cold impact resistance to said polyamide.

2. The molding compound of claim 1, wherein said polyamide 1012 has a relative viscosity in the range of 1.8–2.5.

3. The molding compound of claim 1, wherein said plasticizer is present in the amount of 4–20 wt. % based on the weight of the polyamide.

4. The molding compound of claim 1, wherein said plasticizer is selected from the group consisting of C$_{2-12}$ esters of p-hydroxybenzoic acid and $C_{2-12}$ amides of arylsulfonic acids.

5. The molding compound of claim 5, wherein said plasticizer is selected from the group consisting of p-hydroxybenzoic acid ethylester, p-hydroxybenzoic acid octylester, toluenesulfonic acid n-butylamide, toluenesulfonic acid n-octylamide, benzenesulfonic acid n-butylamide and benzenesulfonic acid n-2-ethylhexylamide.

6. The molding compound of claim 5, wherein said plasticizer is benzenesulfonic acid n-butylamide.

* * * * *